R. ABELL.
SPEED INDICATING INSTRUMENT.
APPLICATION FILED JUNE 12, 1911.
1,045,111.
Patented Nov. 26, 1912.
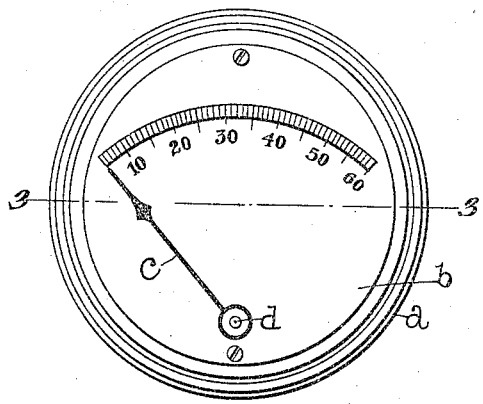
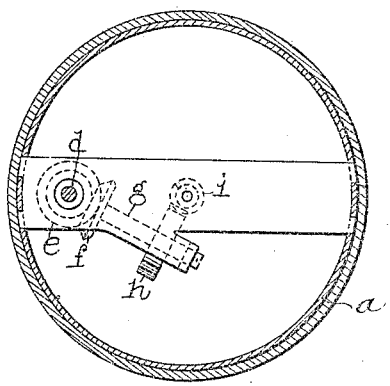
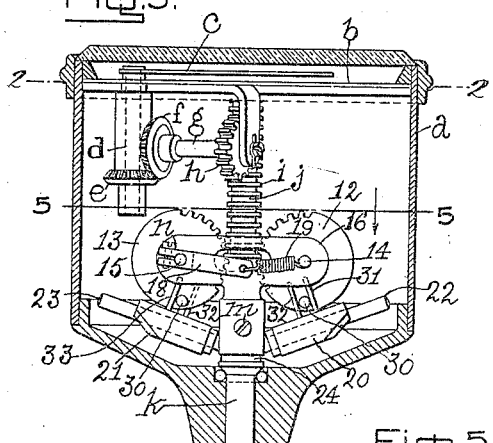
Witnesses:
M. G. Crozier
J. Murphy
Inventor,
Rollin Abell
by Jas. H. Churchill
Atty

UNITED STATES PATENT OFFICE.

ROLLIN ABELL, OF BOSTON, MASSACHUSETTS.

SPEED-INDICATING INSTRUMENT.

1,045,111.	Specification of Letters Patent.	Patented Nov. 26, 1912.

Application filed June 12, 1911. Serial No. 632,559.

*To all whom it may concern:*

Be it known that I, ROLLIN ABELL, a citizen of the United States, residing in Boston, county of Suffolk, and State of Massachusetts, have invented an Improvement in Speed-Indicating Instruments, of which the following description, in connection with the accompanying drawings, is a specification, like letters on the drawings representing like parts.

This invention relates to speed indicating instruments of the class shown and described in U. S. Patent No. 927,828 dated July 13, 1909, in which a weighted governor responding to centrifugal action effects longitudinal movement of a toothed sleeve to move a pointer or index.

The present invention has for its object to provide an instrument of the class described, in which the weighted governor is balanced in all positions and under all conditions, and is not susceptible to vibrations from outside the instrument, whereby the accuracy, durability and efficiency of instruments of this class is increased. For this purpose, the instrument is provided with sliding weights, which are mounted or arranged to move preferably in inclined paths, the inclination of which is such that the distance the weights are raised is in the same ratio to the downward movement of the toothed sleeve, as the weight of said sleeve is to the weight of said weights. These and other features of this invention will be pointed out in the claims at the end of this specification.

Figure 1 is a plan view of a speed indicating instrument embodying this invention. Fig. 2, a cross section of the instrument directly below the dial thereof, taken on the line 2—2, Fig. 3. Fig. 3, a vertical central section of the casing on the line 3—3, Fig. 1, and an elevation of the operative parts in a position of rest. Fig. 4, a view like Fig. 3, with the operating parts in the position they occupy when the instrument is in use. Fig. 5, a section on the line 5—5, Fig. 3, and Fig. 6, a modification to be referred to.

The instrument in the main is the same as that shown and described in the patent referred to, and comprises a casing *a* containing a dial *b* having graduations indicative of speed, and with which coöperates a pointer or index *c* mounted on a shaft *d* provided with a bevel gear *e*, which meshes with and is rotated by a bevel gear *f* on a shaft *g* having a spur gear *h*, which meshes with and is rotated by annular ribs or teeth *i* on a sleeve *j* movable longitudinally on a rotatable shaft *k* constituting the rotatable element of the instrument. The shaft *k* is rotated by the flexible shaft 10, which in practice is connected with the rotating part whose speed is to be indicated, such for instance as the front wheel of an automobile. The sleeve *j* is moved longitudinally on the shaft *k*, by gears or toothed disks 12, 13, mounted on shafts 14, 15, journaled in T-shaped brackets 16, 17, which are secured to the shaft *k* as by screws *m* to rotate therewith, and practically form part thereof, said shafts being located on opposite sides of the shaft *k* and each provided with a crank or arm 18, which is connected by a spring 19 with the other shaft, each crank or arm being adjustably secured to its shaft by a screw *n*. In accordance with the present invention, the toothed disks or cams 12, 13, are rotated by weights 20, 21, which are mounted to slide on guides, preferably on rods 22, 23, extended from a collar 24 on the shaft *k*, said rods being extended from said shaft and preferably upwardly at an angle therefrom.

The weights 20, 21, are operatively connected with the gears 12, 13, and as shown in Figs. 3 and 4, each gear or toothed disk has extended through it near its circumference a pin 30, which as herein shown extends beyond the opposite sides of said gear or disk and on one side of said gear or disk extends between two pins 31, 32, erected on the weight coöperating with the said gear or disk, and on the other side engages one pin 33. The pins 32 engage the pins 30 on the disks or gears and rotate the latter as the weights are slid upwardly on the guide rods in response to the action of centrifugal force on the weights, and the pins 30 on the disks or gears act on the pins 32 to move the weights in the opposite direction in response to the action of the springs 19.

In operation, when the shaft *k* is rotated, the weights are moved longitudinally on their guide rods 22, 23, away from the shaft *k* as represented in Fig. 4, in response to centrifugal action on the said weights, and this sliding movement of the weights effects rotary movement of the gears or toothed disks 12, 13, which in turn effects longitudinal movement of the sleeve *j* in one direction, and through the gear *h*, shaft *g*, gears *f*, *e*, and shaft *d*, effects movement of the pointer or index c from the position shown in Fig. 1 toward the right, thereby indicating the speed of the driving member (not shown), which actuates the flexible shaft. As the speed of the driving member diminishes, the weights 20, 21, are moved on their guide rods in the opposite direction or toward the shaft k, until rotation of the flexible shaft 10 ceases, at which time the pointer c and the weights have been returned to their starting position.

By reference to Figs. 3 and 4, it will be observed that the weights are restrained from movement by outside influences, being prevented from movement in the direction of the axis of the shaft k by the inclined rods upon which they are mounted, and being restrained from movement toward and from said shaft by the opposition of one to the other. In order to insure a perfect balance of the weighted governor, the rods 22, 33, are preferably inclined at such angle to the shaft k that the distance the weight is raised above a base line at right angles to the axis of rotation, is in the same proportion to the downward movement of the circular rack or toothed sleeve j as the weight of the sleeve is to that of the weights. For example, if the weights are raised one-tenth of the distance the toothed sleeve is moved downward, the weight of the said sleeve is one-tenth that of the weights.

I may prefer to connect the sliding weights with the gears by the pin connection shown in Figs. 3 and 4, but it is not desired to limit the invention in this respect, as the connection may be made in other ways, one of which is shown in Fig. 6, wherein the sliding weights are shown as cylindrical in form and provided with rack teeth 40, which engage the teeth of said gears.

Claims.

1. In an instrument of the class described, in combination, a rotatable element, a toothed sleeve axially movable on said element, gears pivoted to said rotatable element on substantially diametrically opposite sides of the toothed sleeve and having their teeth in engagement with said toothed sleeve, sliding weights movable with said rotatable element and away therefrom in an upwardly inclined path in response to centrifugal action, pins erected upon said weights, and pins carried by said gears and coöperating with the pins on said weights, and supports upon which said weights slide, substantially as described.

2. In an instrument of the class described, in combination, a rotatable element, a toothed sleeve axially movable on said element, gears pivoted to said rotatable element on substantially diametrically opposite sides of the toothed sleeve and having their teeth in engagement with said toothed sleeve, rods secured to said rotatable element substantially opposite and inclined upwardly therefrom, weights mounted on said rods to slide thereon, and means for operatively connecting said sliding weights with said rotatable gears, substantially as described.

3. In an instrument of the class described, in combination, a rotatable element, a toothed sleeve axially movable on said rotatable element, gears in mesh with said toothed sleeve, sliding weights movable with said rotatable element and upwardly away therefrom in an inclined path in response to centrifugal action, supports on which said weights slide and means for operatively connecting said sliding weights with said gears to rotate the latter as the weights are slid upwardly away from said rotatable element, substantially as described.

4. In an instrument of the class described, in combination, a rotatable element, a device movable in the direction of the axis of rotation of said element, sliding weights, means for connecting said sliding weights with said axially movable device, and upwardly inclined guides for said weights extended from said rotatable element at such angle as will raise the weights in substantially the same proportion to the downward movement of said device as the weight of the latter is to that of the weights, substantially as described.

5. In an instrument of the class described, in combination, a rotatable element, a toothed sleeve axially movable on said rotatable element, gears in mesh with said toothed sleeve, sliding weights movable with said rotatable element and away therefrom in response to centrifugal action, supports on which said weights slide and means for operatively connecting said sliding weights with said gears to rotate the latter as the weights are slid away from said rotatable element, substantially as described.

In testimony whereof I have signed my name to this specification in the presence of two subscribing witnesses.

ROLLIN ABELL.

Witnesses:
  JAS. H. CHURCHILL,
  J. MURPHY.